United States Patent
Takeo et al.

(10) Patent No.: US 8,467,150 B2
(45) Date of Patent: Jun. 18, 2013

(54) RECORDING HEAD, DISK DRIVE WITH RECORDING HEAD, AND RECORDING METHOD USING RECORDING HEAD

(75) Inventors: Akihiko Takeo, Kunitachi (JP); Masahiro Takashita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/408,912

(22) Filed: Feb. 29, 2012

(65) Prior Publication Data

US 2012/0314326 A1 Dec. 13, 2012

(30) Foreign Application Priority Data

Jun. 7, 2011 (JP) .................................. 2011-127488

(51) Int. Cl.
*G11B 5/127* (2006.01)
(52) U.S. Cl.
USPC ....................................................... 360/125.3
(58) Field of Classification Search
USPC ............................... 360/119.04, 125.03, 125.3
See application file for complete search history.

(56) References Cited

U.S. PATENT DOCUMENTS

| | | | | |
|---|---|---|---|---|
| 7,982,996 B2 * | 7/2011 | Smith et al. | ...................... | 360/59 |
| 8,027,110 B1 * | 9/2011 | Yamanaka et al. | ............... | 360/31 |
| 8,031,426 B2 | 10/2011 | Ikeda et al. | | |
| 8,351,155 B2 * | 1/2013 | Contreras et al. | .......... | 360/125.3 |
| 2008/0304176 A1 | 12/2008 | Takagishi et al. | | |
| 2010/0007992 A1 * | 1/2010 | Yamada et al. | ................ | 360/244 |
| 2010/0027158 A1 | 2/2010 | Takagishi et al. | | |
| 2010/0208379 A1 | 8/2010 | Ikeda et al. | | |
| 2011/0038080 A1 | 2/2011 | Alex et al. | | |
| 2011/0090594 A1 * | 4/2011 | Gurney et al. | ........... | 360/119.04 |

FOREIGN PATENT DOCUMENTS

| | | |
|---|---|---|
| JP | 2009-099248 A | 5/2009 |
| JP | 2010-020857 A | 1/2010 |
| JP | 2010-020857 A2 | 1/2010 |
| JP | 2010-040060 A | 2/2010 |
| JP | 2010-186522 A2 | 8/2010 |
| JP | 2011-040150 A | 2/2011 |

OTHER PUBLICATIONS

Zihui Wang et al., "Chirped-microwave assisted magnetization reversal," Journal of Applied Physics, vol. 105, pp. 093903 (2009).
First Office Action mailed by Japan Patent Office on Jul. 17, 2012 in the corresponding Japanese patent application No. 2011-127488.
First Office Action issued by Japan Patent Office on Jul. 17, 2012 in the corresponding Japanese patent application No. 2011-127488.

* cited by examiner

*Primary Examiner* — Angel Castro
(74) *Attorney, Agent, or Firm* — Knobbe, Martens, Olson & Bear LLP

(57) ABSTRACT

According to one embodiment, a recording head includes a main pole configured to apply a recording magnetic field to a recording medium, a trailing shield opposed to the main pole with a gap therebetween, a spin-torque oscillator at least a part of which is located between the main pole and the trailing shield and configured to apply a high-frequency magnetic field to the recording medium, and an auxiliary oscillator configured to apply an auxiliary magnetic field to the spin-torque oscillator.

18 Claims, 11 Drawing Sheets

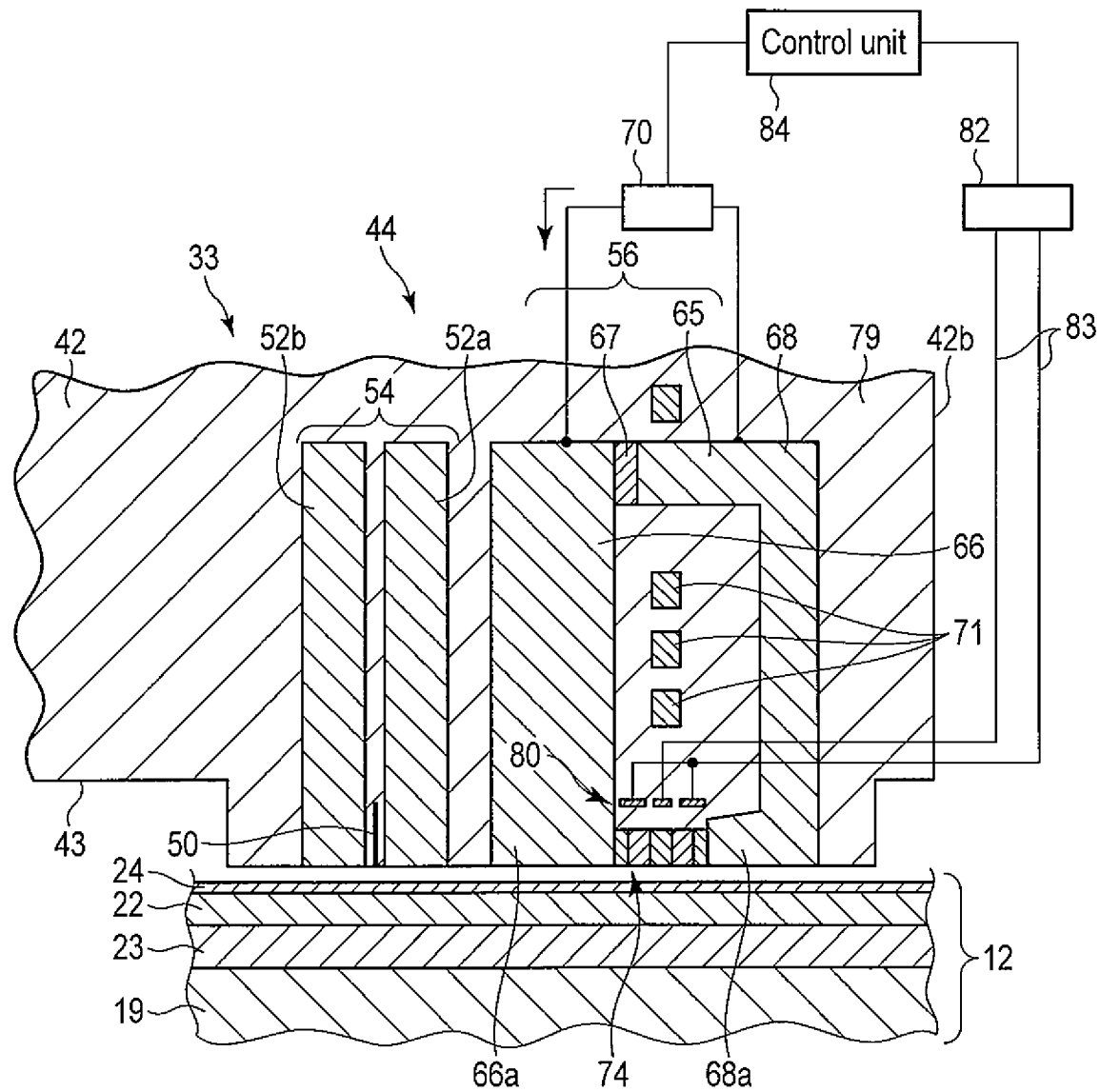
F I G. 3

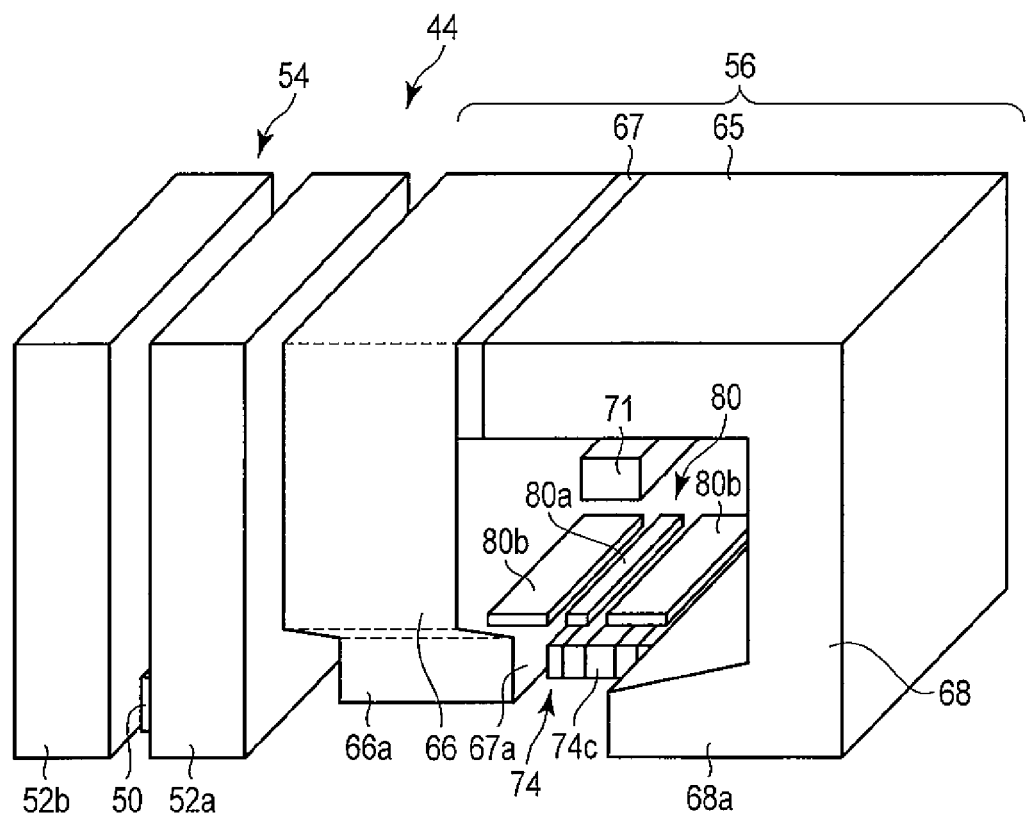
F I G. 4
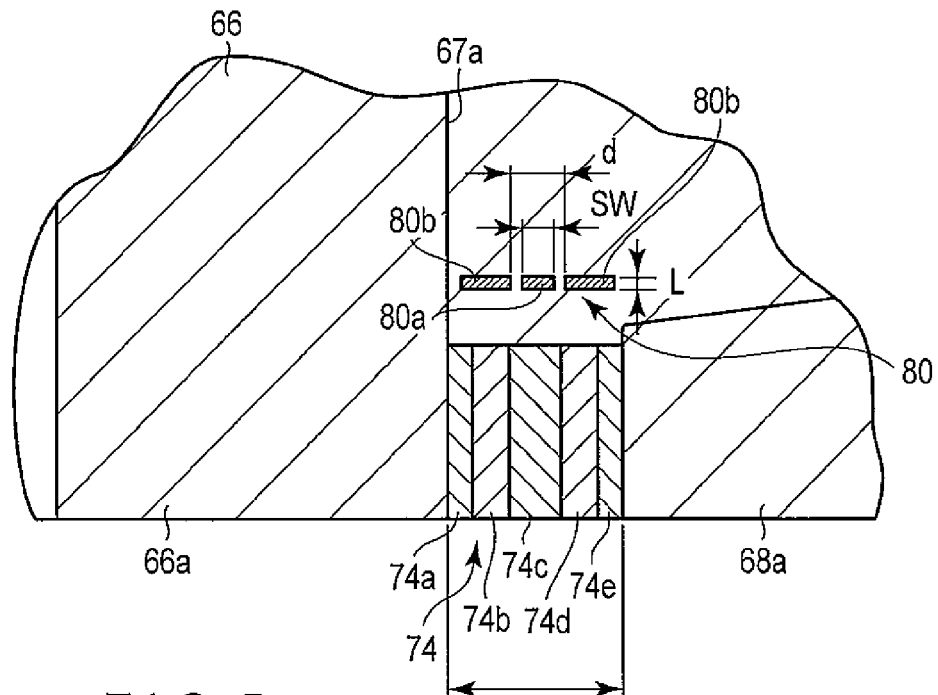
F I G. 5

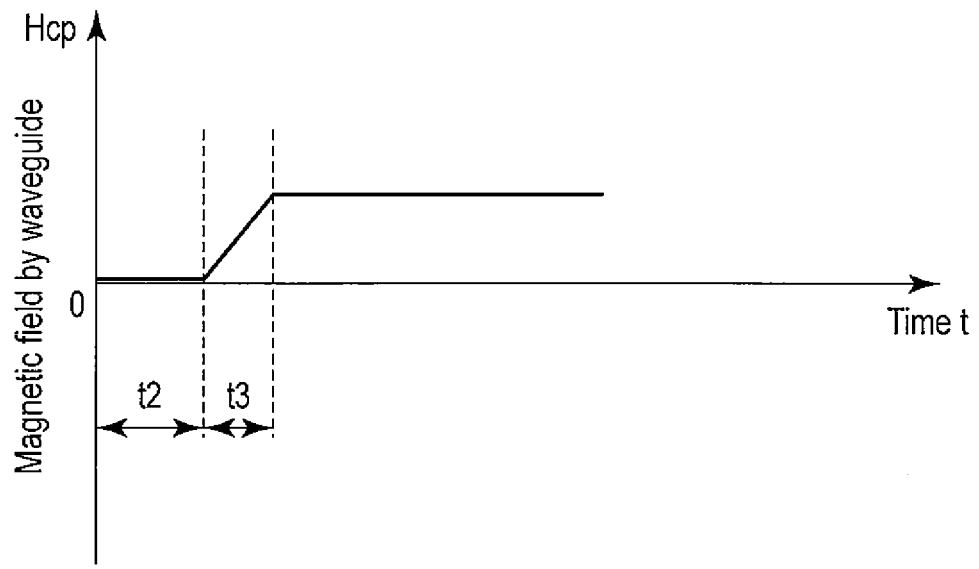
F I G. 12
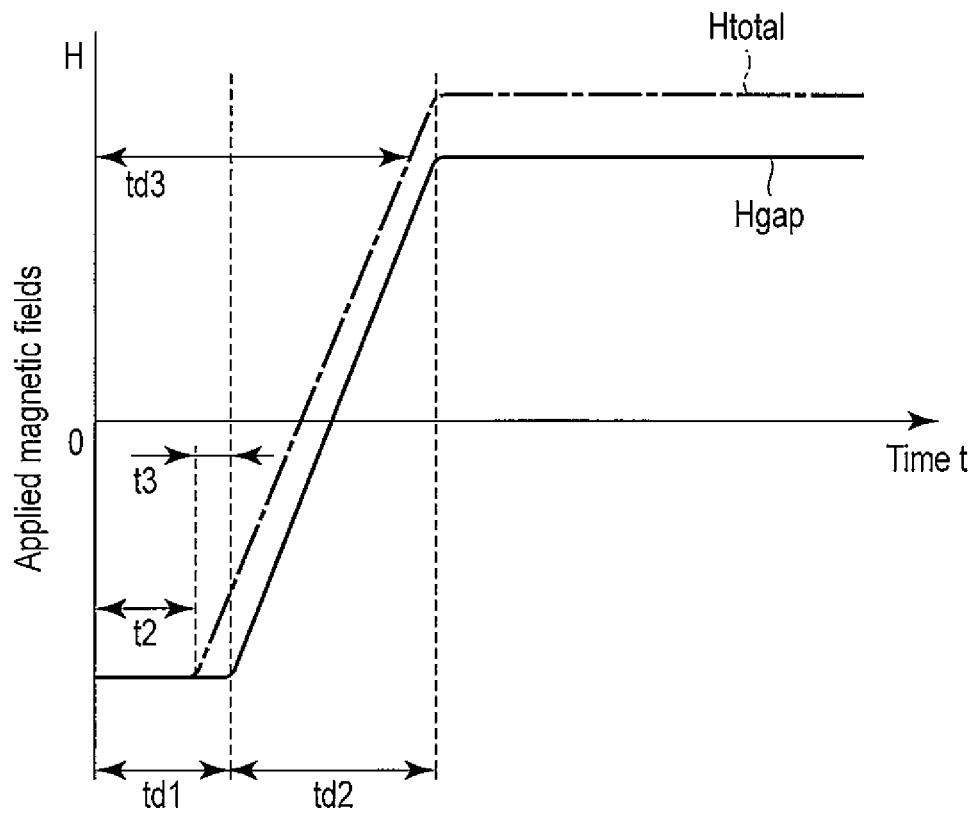
F I G. 13

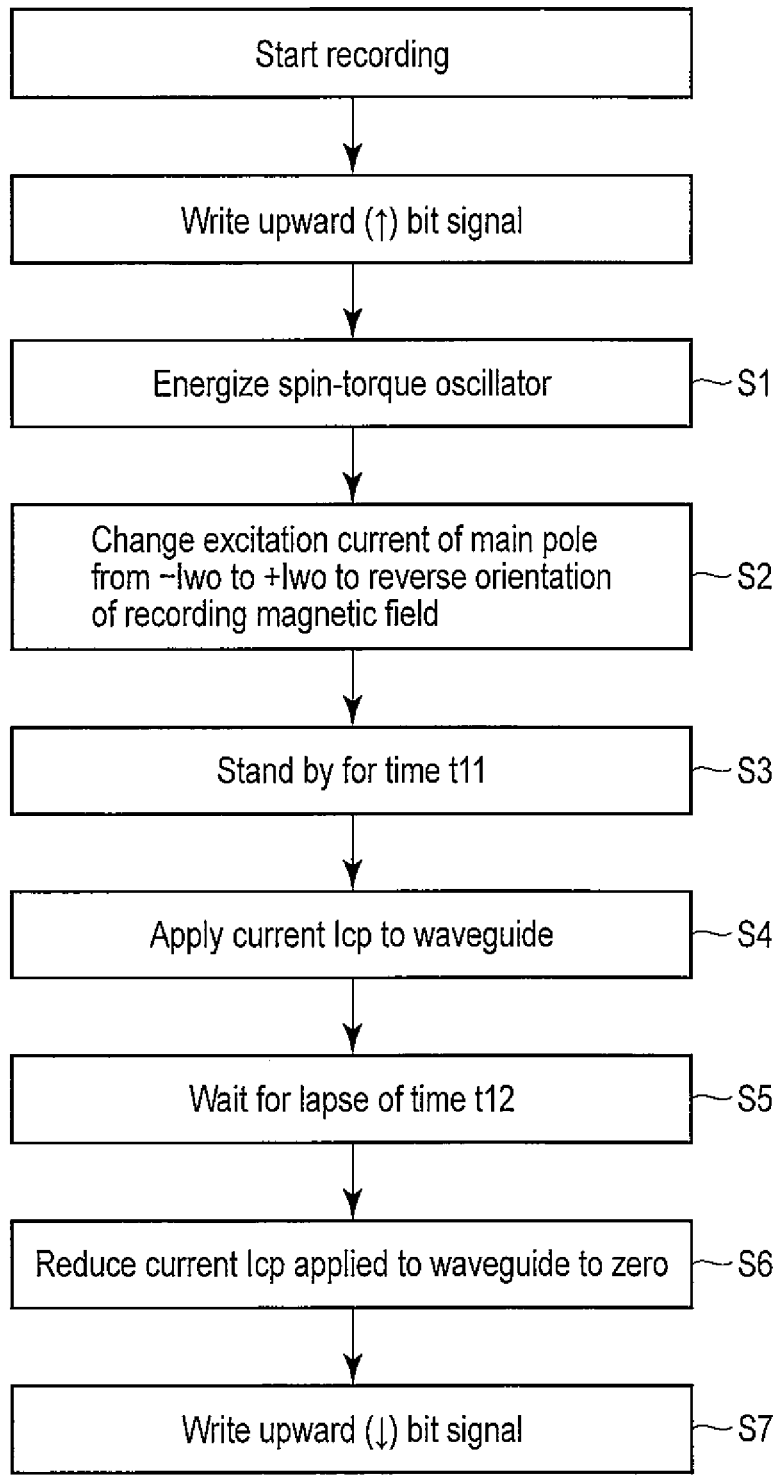
F I G. 14

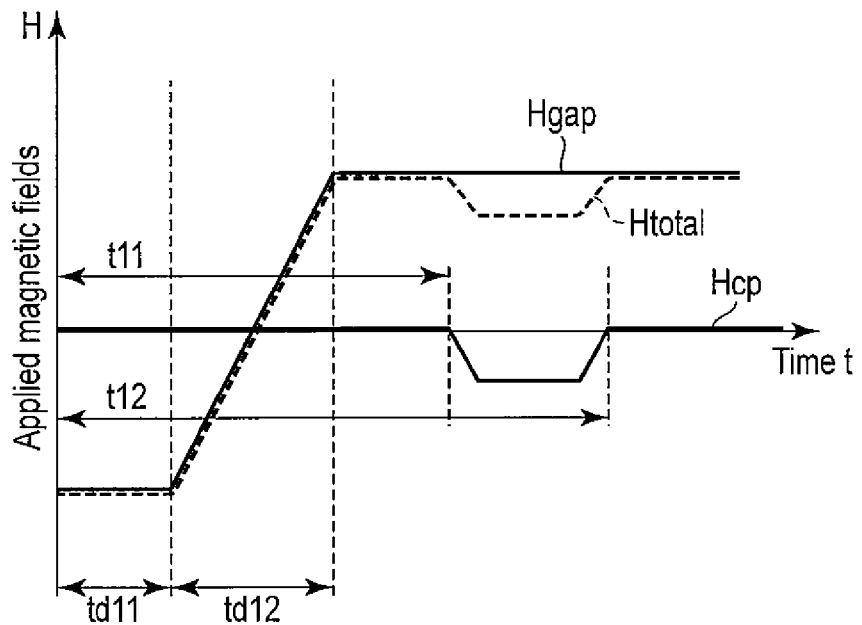
F I G. 15
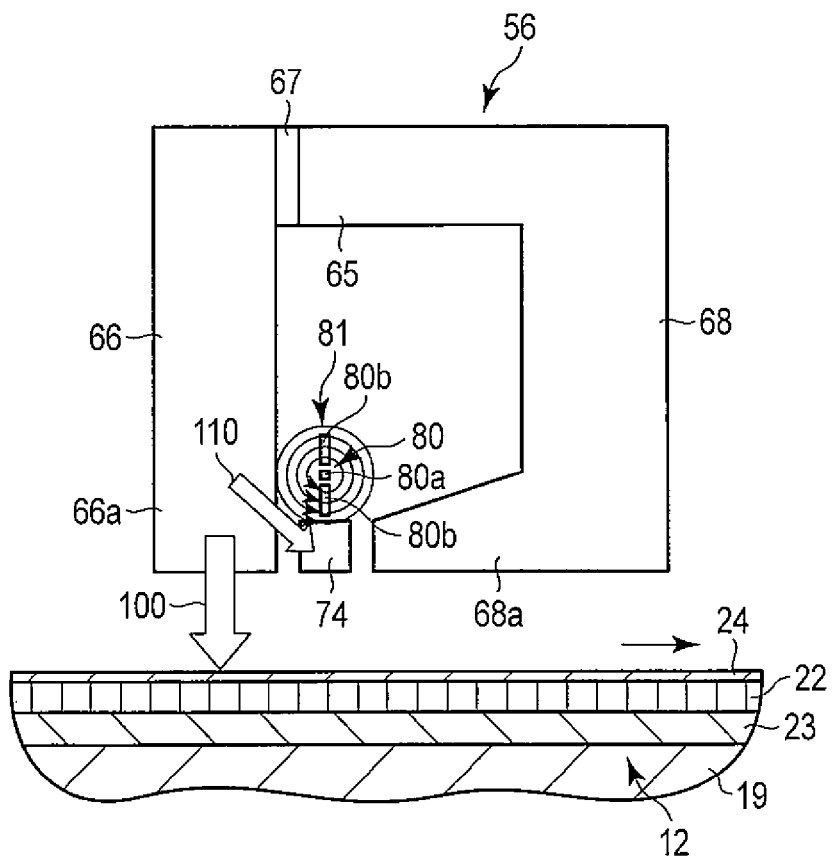
F I G. 16

RECORDING HEAD, DISK DRIVE WITH RECORDING HEAD, AND RECORDING METHOD USING RECORDING HEAD

CROSS-REFERENCE TO RELATED APPLICATIONS

This application is based upon and claims the benefit of priority from prior Japanese Patent Application No. 2011-127488, filed Jun. 7, 2011, the entire contents of which are incorporated herein by reference.

FIELD

Embodiments described herein relate generally to a recording head for perpendicular magnetic recording used in a disk drive, the disk drive with the same, and a recording method using the recording head.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads data from and writes data to the disk. The carriage assembly supports the head for movement relative to the disk. A head section of the magnetic head comprises a recording head for writing and a read head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

To improve the recording density, a magnetic head based on high-frequency magnetic field assist recording is proposed in which a spin-torque oscillator for use as a high-frequency oscillation element is disposed between main and return poles. A high-frequency magnetic field is applied from the oscillator to a magnetic recording layer. If the spin-torque oscillator is thus installed near the main pole, however, the frequency of the high-frequency magnetic field from the oscillator may fluctuate as a recording magnetic field from the main pole changes.

Accordingly, an attempt is made to adjust a magnetic field applied to the spin-torque oscillator by using both a recording gap magnetic field and auxiliary gap magnetic field. The recording gap magnetic field accompanies a recording magnetic field substantially perpendicular to a magnetic recording medium, which is produced by the main pole. The auxiliary gap magnetic field accompanies an auxiliary magnetic field substantially perpendicular to the recording medium, which is produced by an auxiliary pole. A technology is proposed that the frequency of the high-frequency magnetic field is reduced during magnetization reversal of the medium and the medium magnetization can be reversed with lower high-frequency magnetic field strength. In this case, the gap magnetic fields applied to the spin-torque oscillator must be adjusted, i.e., reduced or increased, during the magnetization reversal.

If an attempt is made to quickly change the recording or auxiliary gap magnetic field in the above-described manner, however, magnetization within the main or auxiliary pole cannot respond to quick change. In some cases, therefore, the recording and auxiliary gap magnetic fields may not be able to change. Consequently, magnetization reversal of the recording layer of the perpendicular recording medium becomes insufficient, so that it is difficult to achieve sufficient recording capability.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an enlarged sectional view showing a head section of the magnetic head.

FIG. 4 is a perspective view schematically showing a recording head and read head.

FIG. 5 is an enlarged sectional view showing the disk-side end portion of the recording head.

FIG. 12 is a diagram showing how the magnetic field produced by the coplanar waveguide changes during the recording operation.

FIG. 13 is a diagram showing how the magnetic fields produced by the recording head change during the recording operation.

FIG. 14 is a flowchart showing another recording operation of the recording head.

FIG. 15 is a diagram showing how the magnetic fields produced by the recording head change during the second recording operation.

FIG. 16 is a sectional view schematically showing a recording head and magnetic disk according to a second embodiment.

DETAILED DESCRIPTION

Various embodiments will be described hereinafter with reference to the accompanying drawings. In general, according to one embodiment, a recording head comprises a main pole configured to apply a recording magnetic field to a recording medium; a trailing shield opposed to the main pole with a gap therebetween; a spin-torque oscillator at least a part of which is located between the main pole and the trailing shield and configured to apply a high-frequency magnetic field to the recording medium; and an auxiliary oscillator configured to apply an auxiliary magnetic field to the spin-torque oscillator.

(First Embodiment)

Figure 1:
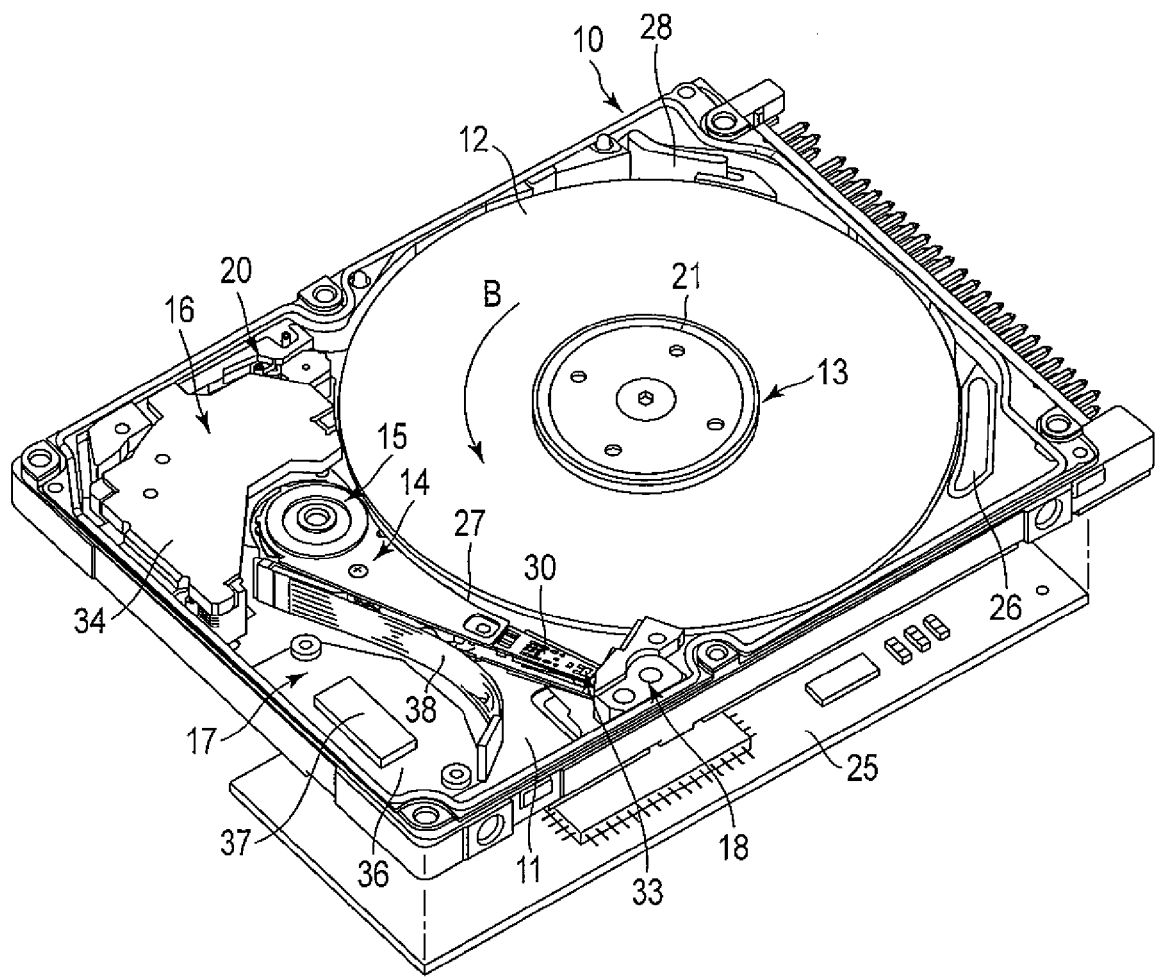
FIG. 1 is a perspective view showing a magnetic disk drive (HDD) according to a first embodiment.
Figure 2:
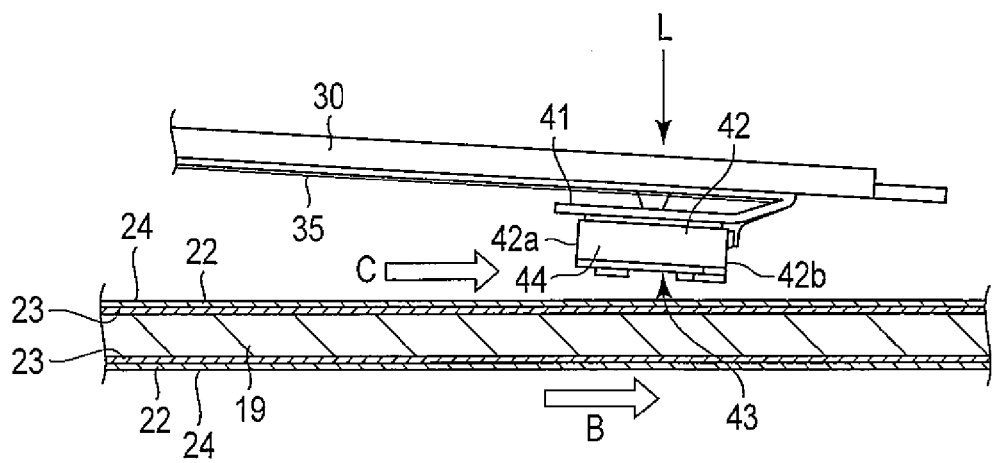
FIG. 2 is a side view showing a magnetic head and suspension of the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 11 in the form of an open-topped rectangular box and a top cover (not shown) in the form of a rectangular plate. The top cover is attached to the base by screws such that it closes the top opening of the base. Thus, the housing 10 is kept airtight inside and can be ventilated through a breather filter 26.

The base 11 carries thereon a magnetic disk 12, for use as a recording medium, and a drive section. The drive section comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data on and from the disk 12. The head actuator 14 supports the heads 33 for movement relative to the surfaces of the disk 12. The VCM 16 pivots and positions the head actuator. The base 11 further carries a ramp loading mechanism 18, inertial latch 20, and board unit 17. The ramp loading mechanism 18 holds the magnetic heads 33 in a position off the magnetic disk 12 when the heads are moved to the outermost periphery of the disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 11 by screws such that it faces a bottom wall of the base. The circuit board 25 controls the operations of the spindle motor 13, VCM 16, and magnetic heads 33 through the board unit 17.

As shown in FIGS. 1 and 2, the magnetic disk 12 is constructed as a perpendicular magnetic recording film medium. The magnetic disk 12 comprises a substrate 19 formed of a nonmagnetic disk with a diameter of, for example, about 2.5 inches. A soft magnetic layer 23 for use as an underlayer is formed on each surface of the substrate 19. The soft magnetic layer 23 is overlain by a perpendicular magnetic recording layer 22, which has a magnetic anisotropy perpendicular to the disk surface. Further, a protective film 24 is formed on the recording layer 22.

The magnetic disk 12 is coaxially fitted on the hub of the spindle motor 13 and clamped and secured to the hub by a clamp spring 21, which is attached to the upper end of the hub by screws. The disk 12 is rotated at a predetermined speed in the direction of arrow B by the spindle motor 13 for use as a drive motor.

The head actuator 14 comprises a bearing 15 secured to the bottom wall of the base 11 and a plurality of arms 27 extending from the bearing. The arms 27 are arranged parallel to the surfaces of the magnetic disk 12 and at predetermined intervals and extend in the same direction from the bearing 15. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each magnetic head 33 is supported on the extended end of its corresponding suspension 30 by a gimbal spring 41. Each suspension 30, gimbal spring 41, and magnetic head 33 constitute a head gimbal assembly. The head actuator 14 may comprise a so-called E-block in which a sleeve of the bearing 15 and a plurality of arms are formed integrally with one another.

As shown in FIG. 2, each magnetic head 33 comprises a substantially cuboid slider 42 and read/write head section 44 on an outflow end (trailing end) of the slider. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

As shown in FIGS. 1 and 2, each magnetic head 33 is electrically connected to a main flexible printed circuit (FPC) 38 (described later) through a relay FPC board 35 secured to the suspension 30 and arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 15 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to the yokes, constitutes the VCM 16.

If the voice coil of the VCM 16 is energized with the magnetic disk 12 rotating, the head actuator 14 pivots, whereupon each magnetic head 33 is moved to and positioned on a desired track of the disk 12. As this is done, the head 33 is moved radially relative to the disk 12 between the inner and outer peripheral edges of the disk.

Figure 6:
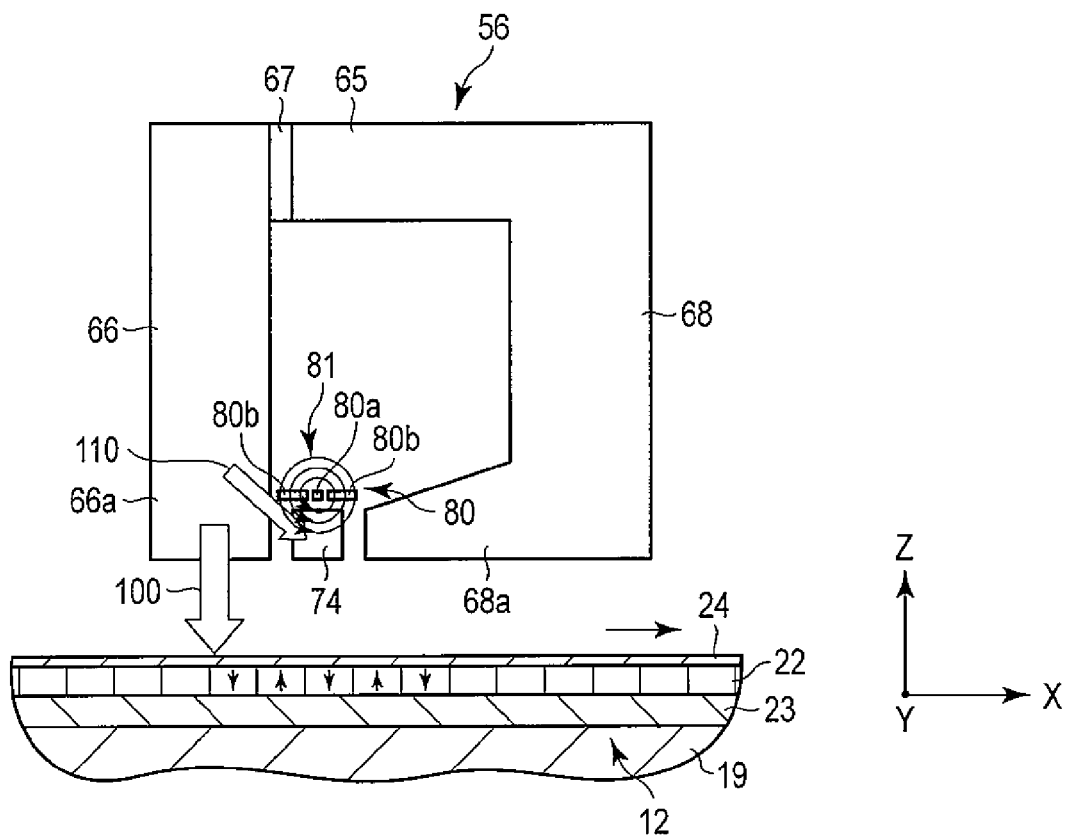
FIG. 6 is a sectional view schematically showing the recording head and magnetic head.

The following is a detailed description of a configuration of each magnetic head 33. FIG. 3 is an enlarged sectional view showing the head section 44 of the head 33, FIG. 4 is a perspective view schematically showing a recording head and read head, FIG. 5 is an enlarged sectional view showing the disk-side end portion of the recording head, and FIG. 6 is a sectional view schematically showing the recording head and magnetic head.

As shown in FIGS. 2 and 3, the magnetic head 33 is constructed as a flying head, which comprises the substantially cuboid slider 42 and head section 44 formed on the outflow or trailing end of the slider. The slider 42 is formed of, for example, a sintered body (AlTic) containing alumina and titanium carbide, and the head section 44 is a thin film. The slider 42 has a rectangular disk-facing surface or air-bearing surface (ABS) 43 configured to face a surface of the magnetic disk 12. The slider 42 is caused to fly by airflow C produced between the disk surface and the ABS 43 as the disk 12 rotates. The direction of airflow C is coincident with the direction of rotation B of the disk 12. The slider 42 is disposed on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIGS. 3 and 4, the head section 44 is constructed as a dual-element magnetic head, comprising a read head 54 and recording head 56 formed on the trailing end 42b of the slider 42 by thin-film processing.

The read head 54 comprises a magnetic film 50 exhibiting the magnetoresistive effect and shielding films 52a and 52b disposed on the trailing and leading sides, respectively, of the magnetic film such that they sandwich the magnetic film between them. The respective lower ends of the magnetic film 50 and shielding films 52a and 52b are exposed in the ABS 43 of the slider 42.

The recording head 56 is located nearer to the trailing end 42b of the slider 42 than the read head 54. The recording head 56 comprises a main pole 66, trailing shield (or return pole) 68, and recording coil 71. The main pole 66 produces a recording magnetic field perpendicular to the surfaces of the magnetic disk 12. The trailing shield 68 is located on the trailing side of the main pole 66 and serves to efficiently close a magnetic path through the soft magnetic layer 23 just below the main pole. The recording coil 71 is located so that it is wound around the magnetic path including the main pole 66 and trailing shield 68 to pass magnetic flux to the main pole while a signal is being recorded on the magnetic disk 12.

A first power supply 70 is connected to the main pole 66 and trailing shield 68, and a current circuit is constructed such that current from the first power supply can be supplied in series through the trailing shield.

As shown in FIGS. 3 to 6, the main pole 66 extends substantially perpendicular to the surfaces of the magnetic disk 12. A distal end portion 66a of the main pole 66 on the disk side is tapered toward the disk surface and has, for example, a trapezoidal cross-section. The distal end surface of the main pole 66 is exposed in the ABS 43 of the slider 42. In the present embodiment, the width of the distal end portion 66a of the main pole 66 is substantially equal to the track width of the magnetic disk 12.

The trailing shield 68 is substantially U-shaped and its distal end portion 68a has an elongated rectangular shape. The distal end surface of the trailing shield 68 is exposed in the ABS 43 of the slider 42. A leading end surface 68b of the distal end portion 68a extends transversely relative to the track of the magnetic disk 12. The end surface 68b is opposed substantially parallel to a trailing end surface 67a of the main pole 66 with write gap WG therebetween.

The recording head 56 comprises a high-frequency oscillator, e.g., a spin-torque oscillator 74, disposed between the distal end portion 66a of the main pole 66 and the trailing shield 68. The oscillator 74 is interposed between the trailing end surface 67a of the distal end portion 66a of the main pole 66 and the leading end surface 68b of the trailing shield 68 and arranged parallel to these end surfaces. The oscillator 74 has its distal end exposed in the ABS 43 and is disposed flush with the distal end surface of the main pole 66 with respect to the surface of the magnetic disk 12. Under the control of the control circuit board 25, the spin-torque oscillator 74 is supplied with direct current along its film thickness as voltage from the first power supply 70 is applied to the main pole 66 and trailing shield 68. By this current supply, the magnetization of the oscillator layer of the oscillator 74 can be rotated to produce a high-frequency magnetic field. In this way, the high-frequency magnetic field is applied to the recording layer 22 of the magnetic disk 12. Thus, the main pole 66 and trailing shield 68 serve also as electrodes for perpendicular energization of the oscillator 74.

As shown in FIGS. 3 and 4, the trailing shield 68 comprises a junction 65 located near the upper part of the main pole 66 in a position off write gap WG or the ABS 43 of the slider 42. The recording element 65 is connected to the main pole 66 by an insulating layer 67 of, for example, $SiO_2$. The insulating layer 67 electrically insulates the main pole 66 and trailing shield 68 from each other. Thus, by providing the insulating layer 67, current from the first power supply 70 can be efficiently applied to the spin-torque oscillator 74 through the main pole 66 and trailing shield 68 that serve also as electrodes of the oscillator 74. $Al_2O_3$ may be used in place of $SiO_2$ for the insulating layer 67.

As shown in FIGS. 3 to 5, the spin-torque oscillator 74 is formed by, for example, sequentially laminating an underlayer 74a, spin injection layer (second magnetic layer) 74b, interlayer 74c, oscillator layer (first magnetic layer) 74d, and cap layer 74e, from the side of the main pole 66 to the side of the trailing shield 68. The underlayer 74a and cap layer 74e are connected to the main pole 66 and trailing shield 68, respectively, which serve also as electrodes. Preferably, the trailing end surface 67a of the distal end portion 66a of the main pole 66 is longer than the spin-torque oscillator 74 along the track width.

The coercivity of the oscillator layer 74d is lower than that of a magnetic field applied from the main pole 66. Also, the coercivity of the spin injection layer 74b is lower than that of the magnetic field applied from the main pole 66.

The materials for the spin injection layer 74b and oscillator layer 74d may be soft magnetic layers having a relatively high saturated magnetic flux density and magnetic anisotropy in the film in-plane direction, such as Co—Pt, Fe—Co—Al, Co—Fe, Co—Ni—Fe, Ni—Fe, Co—Zr—Nb, Fe—N, Fe—Si, Fe—Al—Si, Fe—Co—Al, Fe—Co—Si, and Co—Fe—B, or Co—Cr-based magnetic alloy films whose magnetization is oriented in the film in-plane direction, such as Co—Ir.

Further, materials with high perpendicular orientation such that the magnetization is oriented perpendicular to the film plane may be used for the spin injection layer 74b and oscillator layer 74d. These materials include Co—Cr-based magnetic layers, such as Co—Cr—Pt, Co—Cr—Ta, Co—Cr—Ta—Pt, and Co—Cr—Ta—Nb; RE-TM-based amorphous alloy magnetic layers, such as Tb—Fe—Co; Co multilayers, such as Co/Pd, Co/Pt, Co/Ni, and Co—Cr—Ta/Pd; Co—Pt— or Fe—Pt-based alloy magnetic layers; Sm—Co-based alloy layers, etc. Furthermore, a laminated film comprising the above-described materials stacked in layers may be used to adjust saturation magnetization and an anisotropic magnetic field. If the laminated film is used, the saturated magnetic flux density (Bs) and anisotropic magnetic field (Hk) can be adjusted for the oscillator layer 74d and spin injection layer 74b.

For example, a 5- to 20-nm-thick film of a high-Bs soft magnetic material (Fe—Co/Ni—Fe laminated film) can be used for the oscillator layer 74d. In this case, for example, a 2- to 60-nm-thick film of a Co—Pt alloy whose magnetization is oriented perpendicular to the film plane can be used for the spin injection layer 74b.

A nonmagnetic material with high spin transmissibility, such as copper, gold, or silver, can be used for the interlayer 74c. The film thickness of the interlayer 74c can be adjusted to one-atomic-layer thickness to about 3 nm. Thus, exchange couplings between the interlayer 74c and spin injection layer 74b can be reduced.

Preferably, the element size (size of a cross-section taken along a plane perpendicular to the direction of lamination) of the spin-torque oscillator 74 is adjusted to 10 to 100 nm square. The element shape is not limited to the cuboid shape and may alternatively be columnar or hexagonally prismatic. However, the element size is not limited to those values, and the materials and sizes of the oscillator layer 74d, spin injection layer 74b, and interlayer 74c are optionally selectable.

Although the spin injection layer 74b, interlayer 74c, and oscillator layer 74d are stacked in the order named, the oscillator layer, interlayer, and spin injection layer may alternatively be stacked in this order. In this case, the distance between the main pole 66 and oscillator layer 74d is reduced, so that a range in which a recording magnetic field produced by the main pole and a high-frequency magnetic field produced by the oscillator layer are efficiently superposed is enlarged over the medium, thereby enabling satisfactory recording.

The frequency and strength of the high-frequency magnetic field produced by the spin-torque oscillator 74 are determined depending on the strength and orientation of a magnetic field applied to the oscillator 74 and the orientation and magnitude of the current supplied to the oscillator 74.

As shown in FIGS. 4 to 6, the recording head 56 comprises a coplanar waveguide 80, which functions as an auxiliary oscillator that applies an auxiliary magnetic field to the spin-torque oscillator 74. The waveguide 80, which is disposed near the oscillator 74, comprises a line conductor 80a and two ground planes 80b. The line conductor 80a is disposed on the opposite side of the oscillator 74 to the magnetic disk 12. The grounding conductors 80b are arranged on either side of the line conductor in a common plane therewith such that they sandwich the line conductor between them. In the present embodiment, the waveguide 80 is disposed in a plane substantially parallel to the surfaces of the disk 12. The line conductor 80a and grounding conductors 80b extend parallel to each other along the track width. As shown in FIG. 6, moreover, the waveguide 80 is disposed in such a position that the auxiliary magnetic field produced thereby crosses the oscillator layer 74d of the spin-torque oscillator 74 substantially perpendicularly. The line conductor 80a and grounding conductors 80b of the waveguide 80 are connected to a second power supply 82 by conducting members 83, individually. An auxiliary magnetic field 81 is produced if the coplanar waveguide 80 is energized by the second power supply 82. The first and second power supplies 70 and 82 are arranged on, for example, the control circuit board 25 and connected to a control unit 84 on the circuit board. Further, each of the conducting members 83 is connected to the board unit 17 by the relay FPC 35 shown in FIG. 2.

Preferably, a characteristic impedance $Z_{cop}$ of the coplanar waveguide 80, like those of many microwave-type cable assemblies, connectors, amplifiers, etc., is designed for about 50 Ω. The waveguide 80 is disposed within a dielectric. The width of the line conductor 80a and the distance between the two ground planes 80b are assumed to be SW and d, respectively. Further, thickness L of the conductors 80a and 80b is set to be sufficiently smaller than SW and d.

In this case, the characteristic impedance of the coplanar waveguide 80 is calculated as follows:

$$Z_{COP} = \frac{Z_{COP,0}}{\sqrt{\varepsilon_{COP}}} = \frac{\zeta_0}{4\sqrt{\varepsilon_{COP}}} \frac{K(k')}{K(k)} \quad (1)$$

where $\varepsilon_{cop}$ is the effective dielectric constant; $Z_{cop,0}$, characteristic impedance of the coplanar waveguide with $\varepsilon_r=1$; $\zeta_0 = (\mu_0/\varepsilon_0)^{1/2}$; k, complete elliptic integral of the first kind; k=SW/d; d=SW+2S; and k'=$(1-k^2)^{1/2}$. If k=SW/d for $Z_{cop}$ of 50 Ω with $Al_2O_3$ for the dielectric is calculated, k=0.37 is obtained. Even if $Z_{cop}$ is deviated from 50 Ω, however, this invention can be performed, although input electric power is reflected. Specifically, calculation can be suitably performed only if $Z_{cop}$ ranges from 10 to 5,000 Ω.

The conducting members 83 for supplying electric power to the coplanar waveguide 80 may be suitably selected from various waveguides, such as conventional coaxial lines, striplines, microstriplines, suspended lines, slotlines, rectangular waveguides, circular waveguides, etc. Further, the loss of supplied electric power can be reduced by conventional means, such as using a coaxial elbow for a bent portion of the coplanar waveguide 80. The coaxial elbow is designed so that its center conductor is made thicker, to provide wideband capacity, or thinner.

If the VCM 16 is activated, according to the HDD constructed in this manner, the head actuator 14 pivots, whereupon each magnetic head 33 is moved to and positioned on a desired track of the magnetic disk 12. Further, the magnetic head 33 is caused to fly by airflow C produced between the disk surface and the ABS 43 as the disk 12 rotates. When the HDD is operating, the ABS 43 of the slider 42 is opposed to the disk surface with a gap therebetween. As shown in FIG. 2, the magnetic head 33 is caused to fly in such an inclined posture that the recording head 56 of the head section 44 is located closest to the surface of the disk 12. In this state, the reproduction head 54 reads recorded data from the disk 12, while the recording head 56 writes data to the disk.

In writing data, as shown in FIGS. 3 and 6, direct current from the first power supply 70 is passed through the spin-torque oscillator 74 to produce a high-frequency magnetic field, which is applied to the perpendicular magnetic recording layer 22 of the magnetic disk 12. Further, the main pole 66 is excited by the recording coil 71 so that a perpendicular recording magnetic field 100 from the main pole is applied to the recording layer 22 of the disk 12 just below the main pole. At the same time, a recording gap magnetic field 110 is produced such that it is directed from the main pole 66 toward the write gap. Thus, data is recorded on the recording layer 22 with a desired track width. Magnetic recording with high coercivity and high magnetically anisotropic energy can be achieved by superposing the high-frequency magnetic field on the recording magnetic field.

In changing the frequency of the high-frequency magnetic field produced by the spin-torque oscillator 74 during magnetization reversal of the magnetic recording layer 22, the coplanar waveguide 80 is energized by the second power supply 82 so that the auxiliary magnetic field 81 is produced by the waveguide 80. In this way, a combination magnetic field comprising the recording gap magnetic field 110 and auxiliary magnetic field 81 can be changed. The coplanar waveguide 80 is a transmission line capable of quickly transmitting high-frequency electric power (not shown). Thus, the frequency of the high-frequency magnetic field produced by the spin-torque oscillator 74 can be changed more quickly.

In consideration of an effective magnetic field applied to medium magnetization during magnetization reversal of the magnetic recording layer 22, a demagnetizing field and anisotropic magnetic field applied to the medium magnetization greatly change during the reversal, so that the resonant frequency greatly changes. During the magnetization reversal, therefore, the magnetization of the magnetic recording layer can be further efficiently reversed by changing the frequency of the high-frequency magnetic field produced by the spin-torque oscillator 74.

Figure 7:
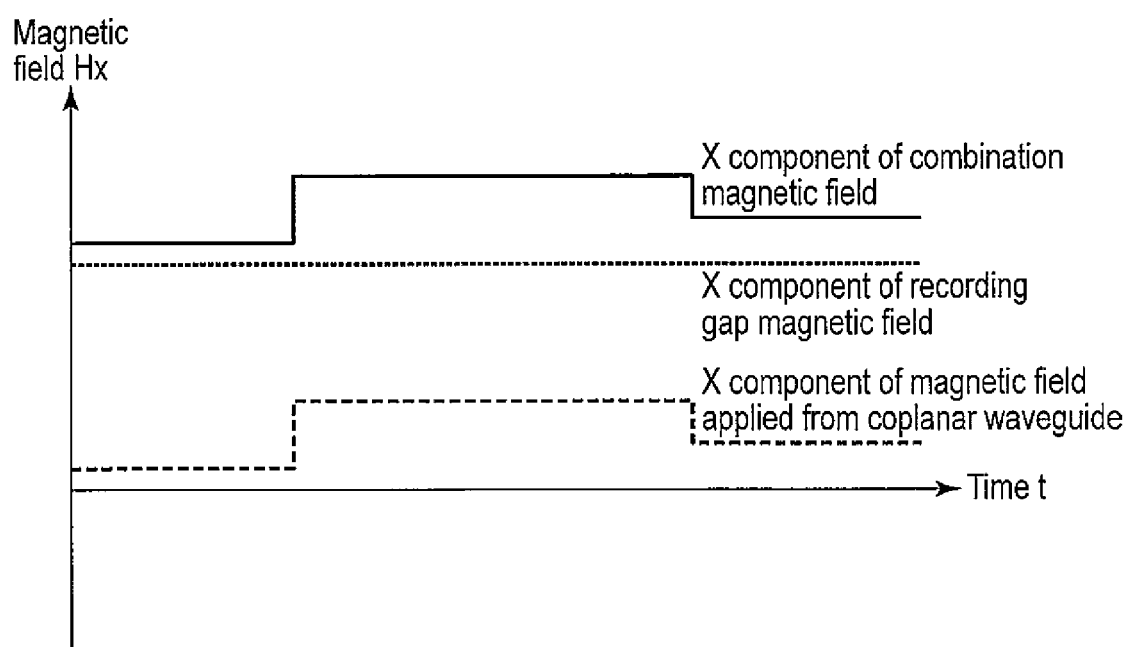
FIG. 7 is a diagram showing how magnetic fields applied from a main pole and coplanar waveguide of the recording head change.
Figure 8:
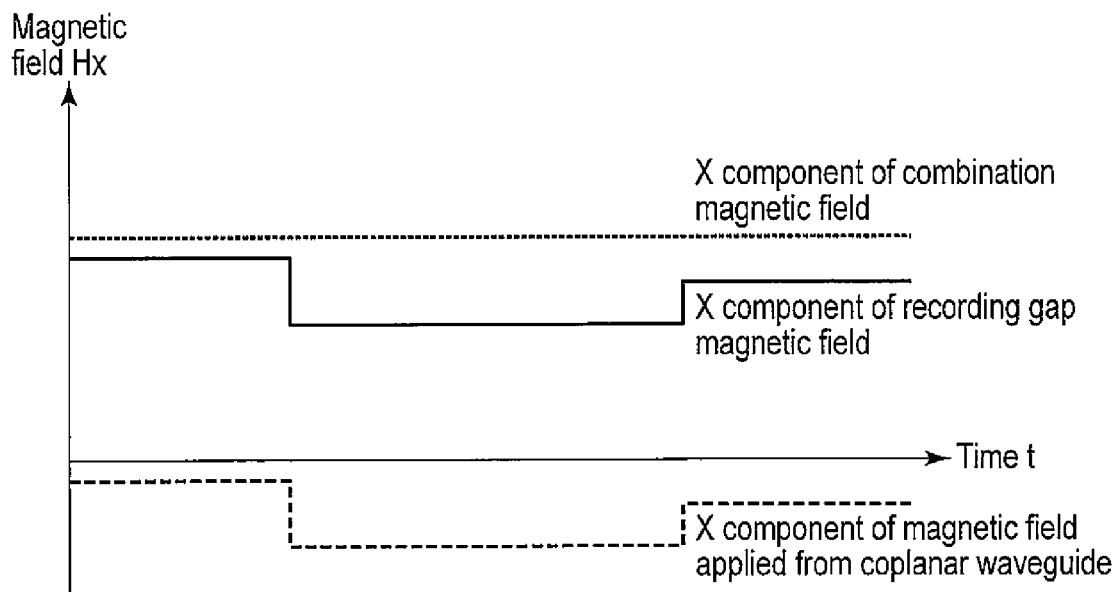
FIG. 8 is a diagram showing how the magnetic fields applied from the main pole and coplanar waveguide of the recording head change.

FIGS. 6, 7, and 8 show examples in which the magnetic field applied to the spin-torque oscillator 74 is changed with time. The X component of the recording gap magnetic field indicated by a broken line in FIG. 7 is not assumed to change during time t. In contrast, the X component of the magnetic field from the coplanar waveguide 80 indicated by a dash-dotted line is changed during time t such that it is temporarily increased and then reduced after the lapse of a predetermined time. Thus, the resultant of the respective X components of the recording gap magnetic field and the magnetic field from the waveguide 80 changes as indicated by a full line. Specifically, the X component of the combination magnetic field temporarily increases during time t and is then slightly reduced.

In the case shown in FIG. 8, in contrast, the X component of the combination magnetic field is temporarily reduced during time t and then slightly increases. The way the X component of the combination magnetic field changes depends on the properties of the spin-torque oscillator 74 and the magnetic recording medium.

Alternatively, the coplanar waveguide 80 may be supplied with AC power or electric power with modulated frequency and amplitude.

Figure 9:
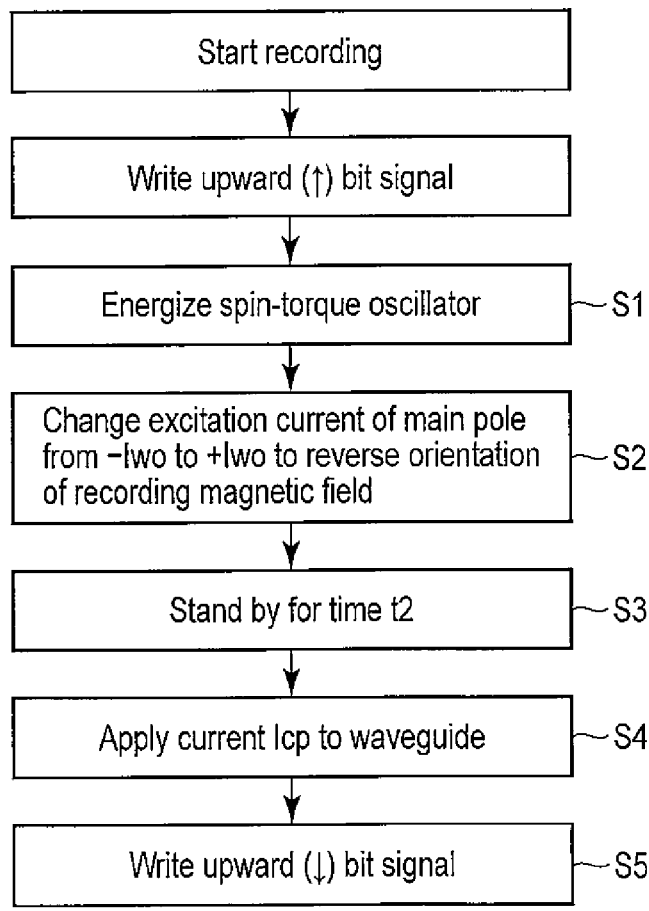
FIG. 9 is a flowchart showing a recording operation of the recording head.

In recording data on the magnetic recording layer 22 by means of the magnetic head 33 constructed in this manner, downward-bit data obtained by magnetization reversal may be written after upward-bit data is written, for example. In this case, as shown in FIG. 9, the spin-torque oscillator 74 is energized to produce a high-frequency magnetic field (S1), and thereafter, the orientation of the recording magnetic field 100 is reversed with the excitation current of the main pole 66 changed from −Iwo to +Iwo (S2).

Figure 10:
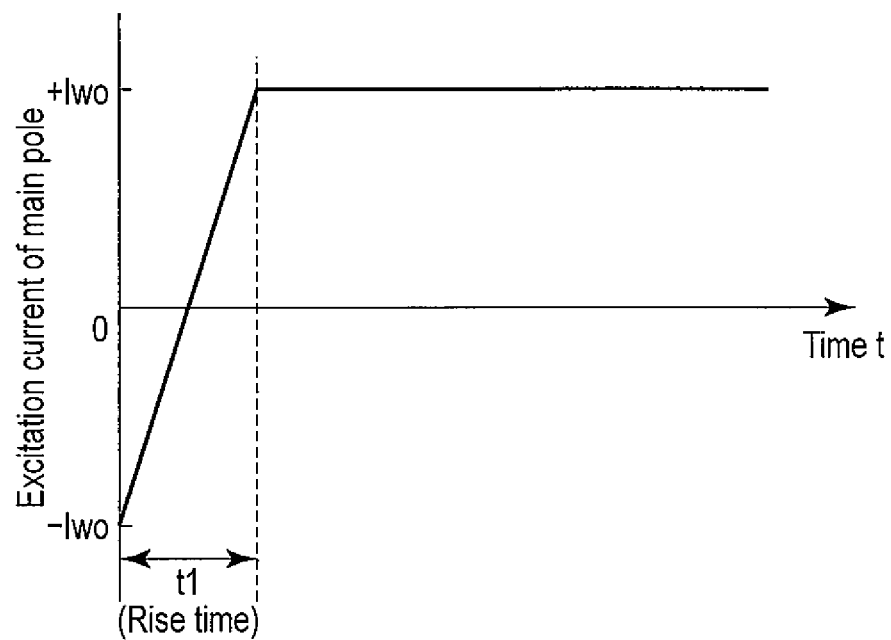
FIG. 10 is a diagram showing how the excitation current of the main pole changes during the recording operation of the recording head.
Figure 11:
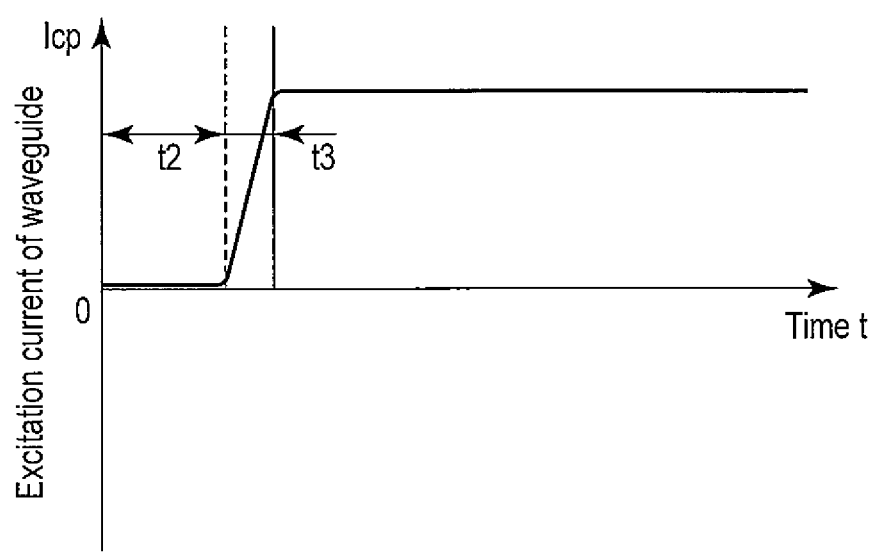
FIG. 11 is a diagram showing how current produced by the coplanar waveguide changes during the recording operation of the recording head.

As shown in FIG. 10, the rise time of current applied to the main pole 66 is assumed to be t1. After standby for time t2 (S3), as shown in FIGS. 9 and 10, current $I_{cp}$ is applied to the coplanar waveguide 80 (S4), and its rise time is assumed to be t3 (t2>t3). Thereupon, the magnetic field produced by the waveguide 80 increases to a corresponding value in time t3, as shown in FIG. 12.

As the magnetic fields are produced by the main pole 66 and coplanar waveguide 80 in this manner, the magnetic field applied to the spin-torque oscillator 74 changes as shown in FIG. 13. A total applied magnetic field $H_{total}$, which is a combination of a gap magnetic field $H_{gap}$ applied from the main pole 66 to the oscillator 74 and the magnetic field produced by the waveguide 80, becomes larger. In FIG. 13, there is a relation, td1+td2>td3. Here td1 designates the time required for the magnetic field from the main pole to actually change after the main pole excitation current Iwo starts to be changed. Symbol td2 designates the time required for the magnetic field from the main pole to reach a maximum after the lapse of td1. Symbol td3 designates the time required for $H_{total}$ and $H_{gap}$ to become equal.

By the application of these magnetic fields, the magnetic recording layer 22 is subjected to magnetization reversal, and a downward-bit signal is written. According to the configuration described above, compared with the case where the coplanar waveguide is not used, time td3 for $H_{total}$ to become a predetermined magnetic field can be made shorter than the time (td1+td2) for $H_{gap}$ to become a predetermined magnetic field. Thus, the response of the spin-torque oscillator 74 can be improved. $H_{cp}$ may be reduced to zero after the strength of $H_{gap}$ is exceeded by that of $H_{total}$.

In performing the magnetization reversal of the magnetic recording layer 22 with lower high-frequency magnetic field strength, downward-bit data obtained by magnetization reversal may be written after upward-bit data is written, for example, as shown in FIG. 14. In this case, the spin-torque oscillator 74 is first energized to produce a high-frequency magnetic field (S1), and the orientation of the recording magnetic field 100 is then reversed with the excitation current of the main pole 66 changed from −Iwo to +Iwo (S2).

Let it be assumed that the rise time of current applied to the main pole 66 is td11 and that the time required for the magnetic field from the main pole to reach a maximum after the lapse of td11 is td12. After standby for time t11 (S3), current $I_{cp}$ is applied to the coplanar waveguide 80 (S4). After the lapse of time t12 (t11<t12) (S5), moreover, current $I_{cp}$ applied to the waveguide 80 is reduced to zero (S6).

Thus, as shown in FIG. 15, the combination magnetic field $H_{total}$, which is the combination of the magnetic field $H_{cp}$ from the coplanar waveguide 80 and the gap magnetic field $H_{gap}$, is temporarily reduced during time t11 and, thereafter, increases again during time t12. The auxiliary magnetic field 81 applied from the auxiliary oscillator is changed in synchronism with the orientation of recording magnetization of the magnetic recording layer 22. The frequency of the high-frequency magnetic field produced by the spin-torque oscillator 74 can be changed more quickly by applying the combination magnetic field $H_{total}$ to the oscillator 74. Thus, the recording layer 22 is subjected to magnetization reversal with lower high-frequency magnetic field strength, and a downward-bit signal is written (S7).

According to the embodiment arranged in this manner, the frequency of the high-frequency magnetic field produced by the spin-torque oscillator can be changed more quickly by applying the auxiliary magnetic field to the spin-torque oscillator by means of the auxiliary oscillator. Thus, there may be provided a recording head, capable of achieving sufficient recording capability and stable recording properties, a disk drive provided with the same, and a recording method using the recording head.

The following is a description of magnetic heads of HDDs according to alternative embodiments. In the description of these alternative embodiments to follow, like reference numbers are used to designate the same parts as those of the first embodiment, and a detailed description thereof is omitted. Different parts will be mainly described in detail.

(Second Embodiment)

FIG. 16 schematically shows a recording head 56 of a magnetic head of an HDD according to a second embodiment and a magnetic disk 12. According to the present embodiment, the recording head 56 comprises a coplanar waveguide 80, for use an auxiliary oscillator, disposed near a spin-torque oscillator 74. In the present embodiment, the waveguide 80 is disposed on the opposite side of the oscillator 74 to the disk 12 and in a plane substantially perpendicular to the surfaces of the disk 12.

The same functions and effects as those of the first embodiment can also be obtained from this configuration.

(Third Embodiment)

Figure 17:
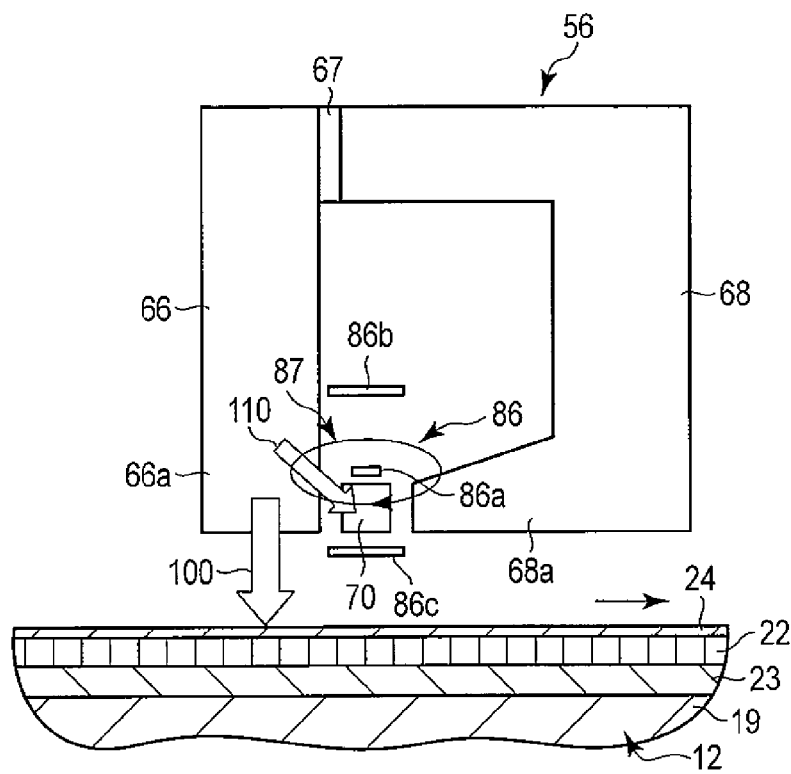
FIG. 17 is a sectional view schematically showing a recording head and magnetic disk according to a third embodiment.

FIG. 17 schematically shows a recording head 56 of a magnetic head of an HDD according to a third embodiment and a magnetic disk 12. According to the present embodiment, the recording head 56 comprises a stripline 86, for use an auxiliary oscillator, disposed near a spin-torque oscillator 74. The stripline 86 comprises a line conductor 86a and two ground planes 86b and 86c, which sandwich the line conductor 86a therebetween from above and below, respectively.

The line conductor 86a and ground planes 86b and 86c are connected to a second power supply by conducting members.

The spin-torque oscillator 74 is located between the line conductor 86a and grounding conductor 86c. An auxiliary magnetic field 87 can be applied to the oscillator 74 from the stripline 86 by energizing the stripline.

(Fourth Embodiment)

Figure 18:
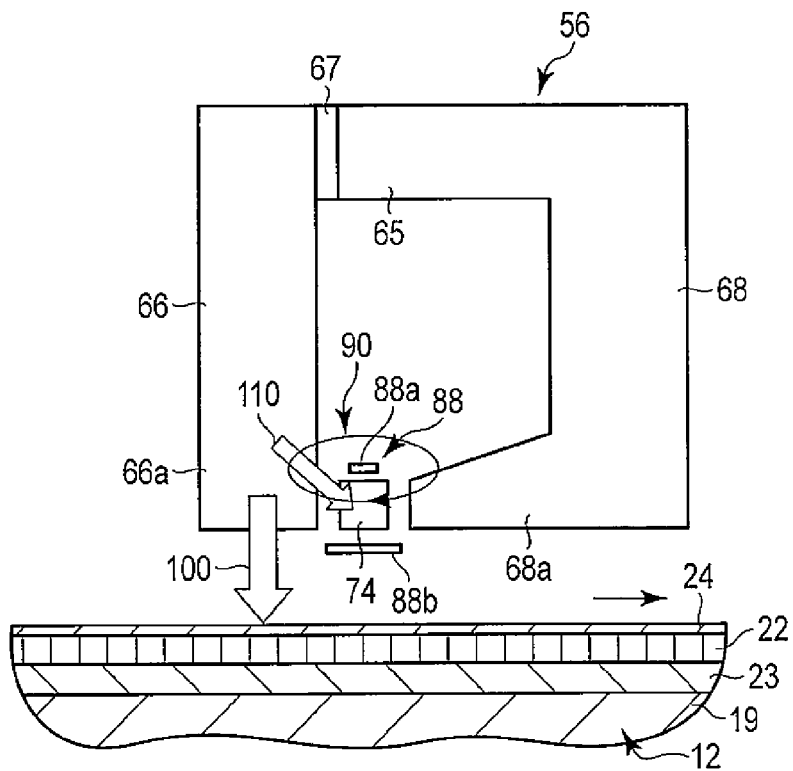
FIG. 18 is a sectional view schematically showing a recording head and magnetic disk according to a fourth embodiment.

FIG. 18 schematically shows a recording head 56 of a magnetic head of an HDD according to a fourth embodiment and a magnetic disk 12. According to the present embodiment, the recording head 56 comprises a microstripline 88, for use an auxiliary oscillator, disposed near a spin-torque oscillator 74. The microstripline 88 comprises a line conductor 88a and grounding conductor 88b, which are connected to a second power supply by conducting members.

The spin-torque oscillator 74 is located between the line conductor 88a and grounding conductor 88c. An auxiliary magnetic field 90 can be applied to the oscillator 74 from the microstripline 88 by energizing the microstripline.

(Fifth Embodiment)

Figure 19:
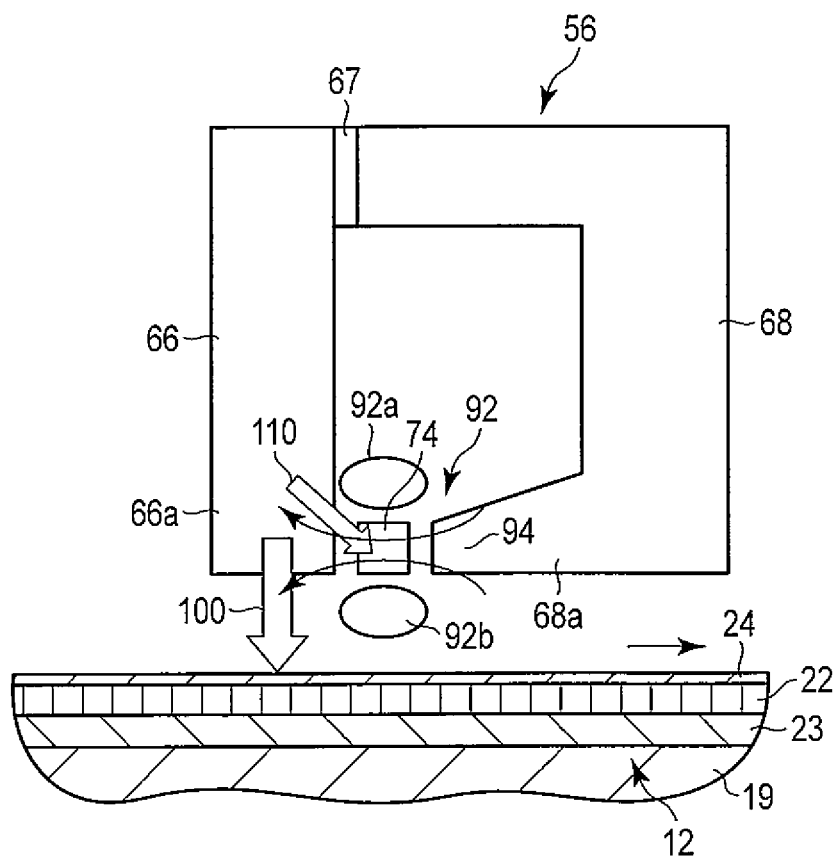
FIG. 19 is a sectional view schematically showing a recording head and magnetic disk according to a fifth embodiment.

FIG. 19 schematically shows a recording head 56 of a magnetic head of an HDD according to a fifth embodiment and a magnetic disk 12. According to the present embodiment, the recording head 56 comprises a Lecher wire 92, for use an auxiliary oscillator, disposed near a spin-torque oscillator 74. The Lecher wire 92 comprises two line conductors 92a and 92b, which are connected to a second power supply by conducting members. The oscillator 74 is located between the line conductors 92a and 92b. An auxiliary magnetic field 94 can be applied to the oscillator 74 from the Lecher wire 92 by energizing the Lecher wire.

In each of the second to fifth embodiments, other configurations of the HDD and magnetic head are the same as those of the foregoing first embodiment.

Also in the recording head 56 according to each of the second to fifth embodiments arranged in this manner, the frequency of the high-frequency magnetic field produced by the spin-torque oscillator can be changed more quickly by applying the auxiliary magnetic field to the spin-torque oscillator by means of the auxiliary oscillator. Thus, there may be provided a recording head, capable of achieving sufficient recording capability and stable recording properties, a disk drive provided with the same, and a recording method using the recording head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recording head comprising:
   a main pole configured to apply a recording magnetic field to a recording medium;
   a trailing shield opposed to the main pole with a gap therebetween;
   a spin-torque oscillator at least a part of which is located between the main pole and the trailing shield and configured to apply a high-frequency magnetic field to the recording medium; and
   an auxiliary oscillator configured to apply an auxiliary magnetic field to the spin-torque oscillator,
   wherein the auxiliary oscillator comprises a coplanar waveguide, and the auxiliary oscillator is arranged in such a position that the auxiliary magnetic field produce by the auxiliary oscillator crosses an oscillator layer of the spin-torque oscillator substantially perpendicularly.

2. The recording head of claim 1, wherein the coplanar waveguide comprises a line conductor on the opposite side of the spin-torque oscillator to the recording medium and two ground planes on either side of the line conductor in a common plane with the line conductor.

3. The recording head of claim 2, wherein the coplanar waveguide is arranged substantially parallel to surfaces of the recording medium.

4. The recording head of claim 2, wherein the coplanar waveguide is in a plane across surfaces of the recording medium.

5. The recording head of claim 1, further comprising a first power supply configured to supply current to the spin-torque oscillator, a second power supply configured to supply current to the auxiliary oscillator, and a control unit configured to control respective amounts and timings of energization of the first and second power supplies in synchronism with an orientation of recording magnetization of the recording medium.

6. A disk drive comprising:
   a disk recording medium comprising a magnetic recording layer;
   a drive section configured to support and rotate the recording medium; and
   the recording head of claim 1 configured to perform data processing on the recording medium.

7. A magnetic recording method using the recording head of claim 1, comprising:
   applying the recording magnetic field from the main pole of the recording head to a recording area of a magnetic recording medium with the high-frequency magnetic field applied from the spin-torque oscillator to the recording area; and
   applying the auxiliary magnetic field from the auxiliary oscillator of the recording head to the spin-torque oscillator, thereby changing the high-frequency magnetic field produced by the spin-torque oscillator, during the application of the recording magnetic field.

8. The magnetic recording method of claim 7, wherein the auxiliary magnetic field applied from the auxiliary oscillator is changed in synchronism with an orientation of recording magnetization of the magnetic recording medium when recording on the magnetic recording medium is performed.

9. The recording head of claim 2, further comprising a first power supply configured to supply current to the spin-torque oscillator, a second power supply configured to supply current to the auxiliary oscillator, and a control unit configured to control respective amounts and timings of energization of the first and second power supplies in synchronism with an orientation of recording magnetization of the recording medium.

10. The recording head of claim 3, further comprising a first power supply configured to supply current to the spin-torque oscillator, a second power supply configured to supply current to the auxiliary oscillator, and a control unit configured to control respective amounts and timings of energization of the first and second power supplies in synchronism with an orientation of recording magnetization of the recording medium.

11. The recording head of claim 4, further comprising a first power supply configured to supply current to the spin-torque oscillator, a second power supply configured to supply current to the auxiliary oscillator, and a control unit configured to control respective amounts and timings of energization of the first and second power supplies in synchronism with an orientation of recording magnetization of the recording medium.

12. A disk drive comprising:
- a disk recording medium comprising a magnetic recording layer;
- a drive section configured to support and rotate the recording medium; and
- the recording head of claim 2 configured to perform data processing on the recording medium.

13. A disk drive comprising:
- a disk recording medium comprising a magnetic recording layer;
- a drive section configured to support and rotate the recording medium; and
- the recording head of claim 3 configured to perform data processing on the recording medium.

14. A disk drive comprising:
- a disk recording medium comprising a magnetic recording layer;
- a drive section configured to support and rotate the recording medium; and
- the recording head of claim 4 configured to perform data processing on the recording medium.

15. A disk drive comprising:
- a disk recording medium comprising a magnetic recording layer;
- a drive section configured to support and rotate the recording medium; and
- the recording head of claim 5 configured to perform data processing on the recording medium.

16. A magnetic recording method using the recording head of claim 2, comprising:
- applying the recording magnetic field from the main pole of the recording head to a recording area of a magnetic recording medium with the high-frequency magnetic field applied from the spin-torque oscillator to the recording area; and
- applying the auxiliary magnetic field from the auxiliary oscillator of the recording head to the spin-torque oscillator, thereby changing the high-frequency magnetic field produced by the spin-torque oscillator, during the application of the recording magnetic field.

17. A magnetic recording method using the recording head of claim 3, comprising:
- applying the recording magnetic field from the main pole of the recording head to a recording area of a magnetic recording medium with the high-frequency magnetic field applied from the spin-torque oscillator to the recording area; and
- applying the auxiliary magnetic field from the auxiliary oscillator of the recording head to the spin-torque oscillator, thereby changing the high-frequency magnetic field produced by the spin-torque oscillator, during the application of the recording magnetic field.

18. A magnetic recording method using the recording head of claim 4, comprising:
- applying the recording magnetic field from the main pole of the recording head to a recording area of a magnetic recording medium with the high-frequency magnetic field applied from the spin-torque oscillator to the recording area; and
- applying the auxiliary magnetic field from the auxiliary oscillator of the recording head to the spin-torque oscillator, thereby changing the high-frequency magnetic field produced by the spin-torque oscillator, during the application of the recording magnetic field.

* * * * *